(12) United States Patent
Linde

(10) Patent No.: US 12,429,166 B2
(45) Date of Patent: Sep. 30, 2025

(54) CRYOGENIC STORAGE TANK, AIRCRAFT WITH A CRYOGENIC STORAGE TANK AND METHOD FOR FORMING A HYBRID METAL POLYMER JOINT

(71) Applicant: Airbus Operations GmbH, Hamburg (DE)

(72) Inventor: Peter Linde, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 345 days.

(21) Appl. No.: 18/155,940

(22) Filed: Jan. 18, 2023

(65) Prior Publication Data
US 2023/0228376 A1  Jul. 20, 2023

(30) Foreign Application Priority Data
Jan. 20, 2022 (EP) .................................. 22152363

(51) Int. Cl.
*F17C 1/00* (2006.01)
*B29C 65/64* (2006.01)
*B29L 31/00* (2006.01)

(52) U.S. Cl.
CPC .............. *F17C 1/00* (2013.01); *B29C 65/645* (2013.01); *B29L 2031/7172* (2013.01); *F17C 2209/221* (2013.01); *F17C 2209/234* (2013.01); *F17C 2221/012* (2013.01); *F17C 2270/0189* (2013.01)

(58) Field of Classification Search
None
See application file for complete search history.

(56) References Cited

U.S. PATENT DOCUMENTS

| | | | | |
|---|---|---|---|---|
| 2,365,696 A | * | 12/1944 | Grubb | B23K 9/0026 228/173.6 |
| 3,662,780 A | * | 5/1972 | Marsh | B01J 47/022 220/62.19 |
| 8,894,801 B2 | * | 11/2014 | Griess | B29C 70/86 156/306.9 |

(Continued)

FOREIGN PATENT DOCUMENTS

| | | |
|---|---|---|
| CN | 112833324 A | 5/2021 |
| WO | 2014079402 A2 | 5/2014 |

OTHER PUBLICATIONS

European Search Report dated Jul. 14, 2022; priority document.

*Primary Examiner* — Jenna M Maroney
(74) *Attorney, Agent, or Firm* — Greer, Burns & Crain, Ltd.

(57) ABSTRACT

A cryogenic storage tank including a first metallic end piece having a first structured connection area on its outer surface, a second metallic end piece having a second structured connection area on its outer surface, a hollow body extending between the first structured connection area and the second structured area. The hollow body is formed of a fiber reinforced polymer-based composite, a first metallic clamp having a third structured connection area and a second metallic clamp having a fourth structured connection area. The hollow body is arranged between and in intimate contact with the first structured connection area of the first metallic end piece and with the third structured connection area of the first metallic clamp and is arranged between and in intimate contact with the second structured connection area of the second metallic end piece and with the fourth structured connection area of the second metallic clamp.

14 Claims, 4 Drawing Sheets

(56) References Cited

U.S. PATENT DOCUMENTS

| | | | |
|---|---|---|---|
| 10,619,263 B2 | 4/2020 | Brandl et al. | |
| 2009/0314785 A1 | 12/2009 | Cronin et al. | |
| 2014/0238597 A1* | 8/2014 | Kleber | F17C 13/06 |
| | | | 156/293 |
| 2015/0336680 A1 | 11/2015 | Schumacher et al. | |
| 2016/0036071 A1* | 2/2016 | Klewer | H01M 8/04044 |
| | | | 429/435 |
| 2017/0334564 A1 | 11/2017 | Born et al. | |
| 2018/0326674 A1* | 11/2018 | Yang | B32B 15/16 |
| 2020/0070269 A1* | 3/2020 | Wang | B23K 35/3053 |
| 2023/0228376 A1* | 7/2023 | Linde | B29C 66/43 |
| | | | 62/45.1 |

\* cited by examiner

CRYOGENIC STORAGE TANK, AIRCRAFT WITH A CRYOGENIC STORAGE TANK AND METHOD FOR FORMING A HYBRID METAL POLYMER JOINT

CROSS-REFERENCES TO RELATED APPLICATIONS

This application claims the benefit of the European patent application No. 22152363.2 filed on Jan. 20, 2022, the entire disclosures of which are incorporated herein by way of reference.

FIELD OF THE INVENTION

The invention relates to a cryogenic storage tank, an aircraft with a cryogenic storage tank and a method for forming a hybrid metal polymer joint.

BACKGROUND OF THE INVENTION

Cryogenic storage tanks may be used for storing liquid hydrogen, for example, for use as a fuel for driving a vehicle. The vehicle may be a motor vehicle such as a car, lorry or train or may be an aircraft. US 2015/033 6680 A1 discloses a tank system for the cryogenic storage of hydrogen and an aircraft with a tank system installed therein. Liquid hydrogen stored within the tank system is used as a fuel for the aircraft engine in place of carbon-based fuels such as kerosene. The cryogenic storage tank is typically substantially cylindrical and includes openings for allowing the tank to be filled with hydrogen as well as to supply the stored liquid hydrogen to the engine. The tank may be arranged under or integrated into the wing or the fuselage of the aircraft, for example. It is desirable that the tank system is adapted to the available space within the aircraft and also does not impede the aerodynamics of the aircraft.

SUMMARY OF THE INVENTION

It is an object to provide an improved cryogenic storage tank which is suitable for use in an aircraft.

According to the invention, a cryogenic storage tank is provided which comprises a first metallic end piece having a first structured connection area on its outer surface, a second metallic end piece having a second structured connection area on its outer surface and a hollow body which extends between the first metallic end piece and the second metallic end piece. The hollow body is formed of a fiber reinforced polymer-based composite. A hybrid joint is provided between each end of the hollow body and its respective metallic end piece to attach the metallic end piece to the fiber-reinforced polymer-based composite of the wall of the hollow body.

In some embodiments, the fiber-reinforced polymer-based composite is a carbon fiber reinforced polymer composite (CFRP) or a fiber reinforced thermoplastic composite. The thermoplastic material may have a melting temperature of at least 200° C. or at least 220° C. The fibers may be carbon fibers, glass fibers or ceramic fibers. In some embodiments, continuous, long or short fibers may be used. Preferably, continuous fibers are used in order to enhance the strength, especially for use in a tank in form of a pressure vessel under internal pressure. The thermoplastic material may be PAEK (polyaryletherketones), PEKK (polyetherketoneketone), PEEK (polyetheretherketone), PEI (polyetherimide), PA (polyamide), PPS (polyphenylene sulfide), PB (polybutenes), PBC (polyester block copolymers), PV (polyvinyls) and PC (polycarbonates).

The fiber-reinforced polymer-based composite forms an outer wall of the hollow body having a thickness, whereby the wall defines an inner chamber in which the cryogenic fuel, e.g., liquid hydrogen, is stored. The hollow body may have a substantially cylindrical form with the two opposing ends of the hollow body being closed by the first and second metallic end pieces, respectively. The first and second metallic end pieces may each have the form of a cap and may have a dome shape.

The use of metallic end pieces and a fiber-reinforced polymer composite for the hollow body has the advantage that the openings for inserting the liquid hydrogen into the tank and for supplying the liquid hydrogen to the engine as well as for connections for flow regulators and for other devices such as pressure and temperature sensors can be placed in the metallic end pieces. This arrangement is simpler to manufacture since gas and liquid tight connections between flanges for the openings can be either integrally formed with the end pieces or joined by welding, for example. The hollow body is, however, formed of a fiber reinforced polymer-based composite which has a lower weight and also high-strength. Thus, the overall weight of the storage tank can be reduced compared with one in which both the hollow body and the end pieces are formed from a metal or alloy.

The cryogenic storage tank further comprises a first metallic clamp which has a third structured connection area and a second metallic clamp having a fourth structured connection area. The fiber-reinforced polymer-based composite of the hollow body is arranged between and in intimate contact with the first structured connection area of the first metallic end piece and with the third structured connection area of the first metallic clamp. The fiber-reinforced polymer-based composite of the hollow body is also arranged between and in intimate contact with the second structured connection area of the second metallic end piece and with the fourth structured connection area of the second metallic clamp.

In embodiments in which the hollow body is substantially cylindrical, the first structured connection area on the outer surface of the first metallic end piece may be substantially annular. In these embodiments, the first metallic clamp may have an annular ring form or a plurality of curved plates may be used. The first metallic clamp is arranged on the hollow body.

The distal end of the hollow body is, therefore, sandwiched between the first structured connection area and the third structured connection area and at least the polymer material of the fiber reinforced polymer composite is positioned in and in intimate contact with the first structured connection area of the first metallic end piece and the third structured connection area of the first metallic clamp.

Similarly, the fourth structured connection area of the second metallic clamp is arranged on the hollow body at the opposing end of the hollow body from the first metallic end and at least the polymer material of the hollow body is in intimate contact with the second structured connection area of the second metallic end piece and with the fourth structured connection area of the second metallic clamp.

Thus, a reliable hybrid metal polymer joint having a sandwich-type structure is formed in which two metallic portions are arranged on opposing sides of the wall of the hollow body that is formed from a fiber-reinforced polymer composite. The structured surfaces of the connection areas of the two metallic portions each have an increased surface roughness and provide protrusions and indentations or pores in the surface in which the material of the hollow body is positioned. This further increase the adhesion and strength of each of the interfaces between the fiber-reinforced polymer-based material of the hollow body and the metallic end pieces.

The first and third structured connection areas may have an increased surface roughness compared to the surface roughness of the adjacent areas of the first metallic end piece and first metallic clamp, respectively. The increased surface roughness may have a surface profile in the micrometer range or nanometer range to form a microstructured or nanostructured surface in the connection areas. Similarly, the second and fourth structured connection areas may have an increased surface roughness over compared to the surface roughness of the adjacent areas of the second metallic end piece and second metallic clamp, respectively. The increased surface roughness may have a surface profile in the micrometer range or nanometer range to form a microstructured or nanostructured surface in the connection areas.

An easy-to-manufacture liquid hydrogen storage tank is provided which in some embodiments has a cylindrical region of CFRP, for weight reduction purposes, with end domes of metal, for easy connection purposes (openings) and avoiding draping difficulties of the CFRP, and ensure a stress concentration free joint between metal and CFRP when building up the wall thickness of the hollow body by filament winding of CFRP material, by welding the CFRP double sided to symmetrical flanges formed on each the end domes.

In some embodiments, the first metallic clamp and/or the second metallic clamp are provided by a separate piece, for example, a separate ring or a separate plate. In these embodiments, the first metallic clamp may be welded to both the first metallic end piece and to the hollow body such that a metal-to-metal welded joint is formed between one portion of the first metallic clamp and the first metallic end piece and a metal-to-polymer hybrid welded joint is formed between a second portion of the first metallic clamp and the material of the hollow body.

In some embodiments, the second metallic clamp has the same structure and is provided by separate piece, such as a separate ring or plate, such as a curved plate. Therefore, in this embodiment, the second metallic clamp is welded to both the second metallic end piece and to the hollow body, at the opposing end of the hollow body, such that a metal-to-metal weld is formed between one portion of the second metallic clamp and the second metallic end piece and such that a metal to polymer hybrid welded joint is formed between another portion of the second metallic clamp and the hollow body.

In other embodiments, the first metal clamp has a first end which is integral with the first metallic end piece and a second end, that opposes the first end, that is welded to the hollow body. In these embodiments, the first metallic clamp may be formed by a flap which is integrally formed in the first metallic end piece which can be folded away to insert or build up the wall of the hollow body between the first and third structured connection areas. Afterwards, the flap can be folded down onto the hollow body and welded to the hollow body.

In some embodiments, the second metallic clamp may have same structure as the first metallic clamp and has a first end that is integral with the second metallic end piece and a second end that is welded to the hollow body. In these embodiments, the second metallic clamp may be formed by a flap which is integrally formed in the second metallic end piece which can be folded away to insert or build up the hollow body between the second and fourth structured connection areas. Afterwards, the flap can be folded down onto the hollow body and welded to the hollow body.

The first connection area of the first metallic end piece may be formed by a first annular flange which is formed on an outer surface of the first metallic end piece. The annular flange may extend axially from the end face of the open end of the first metallic end piece. The first structured connection area is formed on the first annular flange. In some embodiments, the first annular flange has a first abutment surface which extends outwardly, e.g., radially from the first annular flange and has a height. The hollow body may be arranged on the first annular flange such that it abuts the first abutment surface. This further improves the reliability of the hybrid metal polymer joint. The hollow body may have a wall thickness that corresponds to the height of the first abutment surface. In these embodiments, the first metallic clamp therefore has a substantially planar form when it is either welded to the outer surface of the first metallic end piece and the hollow body or in embodiments in which the first metallic clamp has a flap form, the flap is lowered back over the distal end of the hollow body.

The third connection area of the second metallic end piece may be formed by a second annular flange which is formed on an outer surface of the second metallic end piece. The annular flange may extend axially from the end face of the open end of the second metallic end piece. The third structured connection area is formed on the second annular flange. In some embodiments, the second annular flange has a second abutment surface which extends outwardly, e.g., radially from the second annular flange and has a height. The hollow body may be arranged on the second annular flange such that it abuts the second abutment surface. This further improves the reliability of the hybrid metal polymer joint. The hollow body may have a wall thickness that corresponds to the height of the second abutment surface. In these embodiments, the second metallic clamp therefore has a substantially planar form when it is either welded to the outer surface of the second metallic end piece and the hollow body or in embodiments in which the second metallic clamp has a flap form, the flap is lowered back over the distal end of the hollow body.

The hollow body is not limited to a cylindrical form. In some embodiments, the hollow body is elongate and have a cross-section other than circular, for example oval, rounded, polygonal, square or rectangular. The two end pieces need not be arranged at opposing ends of the hollow body, i.e., with an angle of 180° between them, but may be arranged at other angles, such as 90° or any other angle. For example, the position of the end pieces and their connections may depend on the position at which the tank is to be installed, space available, and/or the position of the piping to and from the tank.

In some embodiments, the hollow body includes internal walls and is subdivided into two or more chambers. For example, two or more chambers may be formed that extend the entire length of the hollow body between the first and second metallic end pieces or to provide interconnected chambers. The internal walls may provide additional strength.

An aircraft is also provided which comprises a fuselage, at least one wing, at least one hydrogen consuming device, such as an engine for driving the aircraft, and at least one cryogenic storage tank according to any one of the embodiments described herein. The cryogenic storage tank is suitable for storage liquid hydrogen for use as fuel for the aircraft engine.

The invention also relates to a method for forming a hybrid metal polymer joint. The method of any one of the embodiments described herein can be used to fabricate a cryogenic storage tank, in particular the joint between a metallic end piece and the fiber-reinforced polymer-based composite forming the hollow body of the cryogenic storage tank.

The method comprises forming a structured surface on a first connection area of first metallic object and a second structured surface on a second connection area of a second metallic object. One or more fiber-reinforced polymer-based composite plies are applied to the first structured surface. The one or more composite plies are welded to the first structured surface of the first connection area. The second structured surface of the second connection area of the second metallic object is applied onto the one or more composite plies that have been welded to the first structured surface of the first connection area of the first metallic object. The second structured surface of the second connection area of the second metallic object is then welded to the one or more composite plies.

The composite plies are therefore positioned between the first and second metallic objects and are welded to the structured surface formed on both of the first and second metallic objects. The hybrid-joint has a sandwich type structure with the fiber-reinforced polymer-based composite being positioned between two metallic objects. The contact area between the composite plies and the respective metallic object is increased due to the structured surface formed in the first connection area and in the second connection area. Therefore, a more reliable hybrid metal thermoplastic joint can be formed.

In some embodiments, the structured surface of the first connection area and of the second connection area is formed by laser texturing or laser structuring.

The first and second structured connection areas may have an increased surface roughness over compared to the surface roughness of the adjacent areas of the first metallic object and second metallic object, respectively. The structured connection areas may have a surface profile with features, for example open pores, indentations, protrusions in the micrometer range or nanometer range.

The structured surface may be formed in the first connection area of the first metal object and the second connection area of the second metallic object using the methods described in WO 2014/079402 A2 for nanostructuring and nanostructuring and anodizing a metal surface may be used to form the structured surface A structuring treatment of a metal surface or metal alloy surface of a material optionally comprising an oxide coating may comprise nanostructuring by way of laser radiation or particle radiation in an inert or reactive atmosphere in order to create nanostructures of an oxide of the metal or of the metal alloy, which in the case of titanium can be present in the form of nanotubes. Roughening or structuring of surfaces in the nanometer range improves the adhesion provided by the intimate contact between the nanostructured metallic surfaces and the composite plies.

In some embodiments, subsequently the entire surface is anodized. The method can be performed such that after this structuring treatment, no areas of the connection area remain in which no nanostructuring is present. The nanostructured surface formed by laser structuring is more homogeneous than that created solely by anodizing of the material, for example.

In some embodiments, the connection areas may be structured using a pulsed laser beam, or a continuous particle beam, in an inert or reactive atmosphere, whereby the beam is moved over the connection area. The connection area may be irradiated once or multiple times. The conditions of WO 2014/079402 A2 can generate nanostructured surfaces that provide good adhesion. The scanning of the starting surface using the laser beam or particle beam can be carried out once, or consecutively multiple times, using the same process parameters and the same laser beam or particle beam, or using different process parameters and the same laser beam or particle beam, or using different laser beams and/or particle beams and the same process parameters or different process parameters. In some embodiments, an even finer structure is formed by multiple scanning.

The structured surfaces generated by laser radiation or particle radiation are provided with surface structures and may generally have open-pored, primrose and/or fractal-like nanostructures, such as open-pored mountain and valley structures, open-pored undercut structures, and cauliflower- or nodule-like structures. These structures in general cover the entire metal or metal alloy surface treated with the radiation. In some embodiments, the structured surfaces are chemically modified compared to the starting surface, for example if working in a reactive atmosphere.

The starting surface that comprises the metal or the metal alloy and/or optionally an oxide layer, is frequently not pre-treated or cleaned prior to scanning using the laser beam or particle beam; however, the surface can also be cleaned with a solvent or pickled, for example.

As described above, structuring using a laser beam or particle beam alone provides good adhesion of a large number of materials. However, there are also instances in which oxidation of the surface simultaneously with a nano structuring process is desirable. The surface structure is more uniform and/or having a larger layer thickness, and, in particular, being even more porous than an oxide layer optionally remaining after the treatment using the laser beam or particle beam (if a surface coated with oxide formed the starting surface).

The metal and/or metal alloy that are present in the surface, which, optionally, may be coated at least partially with an oxide layer, are selected from anodizable metals and/or metal alloys. These include in particular aluminum, titanium, magnesium, iron, cobalt, zinc, niobium, zirconium, hafnium, tantalum, vanadium and/or the alloys thereof, and steel. In addition to pure titanium, in particular cobalt-chromium alloys, cobalt-chromium-molybdenum alloys, and the alloys Ti-6Al-4V, Mg-4Al1-Zn, Ta-10W, Al 2024 (Al-4.4Cu-1.5 Mg-0.6Mn) and V2A steel (X5CrNi18-10) used.

The fiber-reinforced polymer composite may be attached to the connection areas by welding. Welding is a process in which energy is applied to the components which causes the material of the components to melt, at least in regions immediately adjacent to the joining interface. This causes fusion of the base material between the components. The energy is them removed so that the components cool down, the molten material solidifies, and a welded joint is formed between the first and second components.

A ply of the composite material may be a single filament or fiber that is coated with polymer or a bundle of such filaments or may have the form of a planar tape or ribbon in which a plurality of fibers are embedded within a polymer matrix. The polymer may be a thermoplastic as thermoplastic can be repeatedly melted and resolidified, thus allowing the hollow body to be built up layer by layer, with successive layers being successively joined to the underlying structure by successive welding processes.

In some embodiments, the fiber-reinforced polymer-based composite is a carbon fiber reinforced polymer composite or a fiber reinforced thermoplastic composite. The thermoplastic material may have a melting temperature of at least 200° C. or at least 220° C. The fibers may be carbon fibers, glass fibers or ceramic fibers. Continuous, long or short fibers may be used. Preferably, continuous fibers are used, especially for a high-performance part. The thermoplastic material may be LM PAEK (polyaryletherketones), PEKK (polyetherketoneketone), PEEK (polyetheretherketone), PEI (polyetherimide), PA (polyamide), PPS (polyphenylene sulfide), PB (polybutenes), PBC (polyester block copolymers), PV (polyvinyls) and PC (polycarbonates).

In an embodiment, the welding process is ultrasonic welding. For example, ultrasonic waves having a frequency in the range of 16 kHz to 60 kHz and with an amplitude in the range of 10 µm to 50 µm are supplied to the composite ply or plies arranged on the first connection area of the first metallic object by a sonotrode for a pre-determined time interval, for example for a few seconds during which the thermoplastic material of the composite ply and adjacent regions of the first metallic object melt causing fusing of the base material. The sonotrode is then switched off, allowing the first metallic object and composite ply or plies and the joint formed by the fusing of the thermoplastic material and the first metallic object to cool down and solidify, thus creating a welded joint between the composite ply and the first metallic object.

The welding of the second structured surface of the second connection area to the one or more composite plies may also be carried out using ultrasonic welding.

Ultrasonic welding of thermoplastic polymers, either in a pure condition or filled with fiber reinforcement, is based on the principle that the kinetic energy of an acoustic wave of ultrasonic frequency propagating inside apart will partly dissipate as heat energy when this wave crosses the interface into an adjacent part. This heat will melt the thermoplastic polymer in regions close to the interface, causing the macromolecular diffusion of the matrix, that is, the thermoplastic material, and metal of the metallic object to form a welded joint between the components after cooling down.

However, the welding process is not limited to ultrasonic welding and other types of welding process may be used, such as infrared welding, induction welding, laser beam welding or a conductive welding and co-consolidation process. The type of welding process may be selected depending on the material of the fiber-reinforced polymer-based composite and the base metallic materials of the metallic objects to be joined.

The one or more composite plies may be applied successively to the first structured surface of the first connection area. In some embodiments, the welding, or ultrasonic welding if used, is carried out after applying each composite ply or may be carried out after applying a subset of a total number of composite plies, for example, every second after applying two composite plies or three stacked composite plies.

The invention also provides a hybrid metal polymer joint that comprises a first metallic object having a first connection area with a structured surface and a second metallic object having a structure surface. A fiber-reinforced polymer-based composite is arranged between and in intimate contact with the structured first connection area of the first metallic object and with the second structured connection area of the second metallic object.

According to the invention, this method may be used to form a cryogenic storage tank, for example a storage tank for liquid hydrogen that is to be used as fuel for an engine, for example an engine of an aircraft.

The first metallic object may be the first metallic end piece of a cryogenic storage tank and the first connection area may be a first flange arranged on the outer surface of the first metallic end piece. In embodiments in which the tank has a substantially cylindrical form, the first connection area may be formed by an annular flange arranged in the outer surface of the first metallic end piece. The second metallic object may comprise a clamp. In some embodiments, the clamp comprises a separate part, such as an annular ring, in the case of an annular flange, or a separate plate. In these embodiments, the second metallic object is welded to the outer surface of the first metallic object, to form a metal to metal welded joint between the clamp and the first metallic object. The second metallic object is also welded to the composite plies at a position above the first connection area, i.e., above the first flange, to form a hybrid metal polymer joint between this portion of the clamp and the composite plies. Ultrasonic welding may be used to form the metal-to-metal joint between the first and second metallic objects and the metal to polymer joint between the second metallic object and the composite plies. A hybrid metal polymer joint having a sandwich structure is formed with the polymer material being sandwiched between two metallic structures.

In other embodiments, the metallic object comprises a clamp that is formed by a flap which is integral with the first metallic end. The flap may have one end which is integral with the metallic end and a free lying distal end. The flap may have a length such that the distal end overlaps with the first connection area of the first metallic object and such that when the one or more composite plies are arranged on and welded to the first connection area, the distal end of the flap can the positioned above the composite plies and applied to the composite plies by folding the flap onto the outermost composite ply. This portion of the flap can then be attached to the composite plies by welding, such as ultrasonic welding to produce a hybrid metal to polymer joint.

In order to form a cryogenic storage tank, a second metallic end piece having a second annular flange on its outer surface providing a third connection area and a second metallic clamp can be provided. A third structured surface is formed on the third connection area of the second metallic end piece and a fourth structured surface is formed on a fourth connection area of the second metallic clamp. Laser structuring or laser texturing may be used as for the first and second structured surfaces. One or more composite plies are wound so as to form a hollow body that extends between the first annular flange of the first metallic end piece and the second annular flange of second metallic end piece. The one or more composite plies are welded to the third structured surface of the second annular flange of the second metallic end piece and the fourth structured surface is welded of the fourth connection area of the second clamp to the one or more composite plies that have been welded to the third structured surface of the second annular flange of the second metallic end piece, and a cryogenic storage tank is produced. Ultrasonic welding may be used. A hybrid metal polymer joint having a sandwich structure is formed with the polymer material being sandwiched between two metallic structures.

Typically, composite plies are successively wound onto and welded to the first connection area and to the third connection area of the second metallic end piece in order to form the hollow body which extends between the first and second metallic end pieces and also to provide the hollow body with a desired wall thickness. Filament winding techniques may be used.

In filament winding, one or more filaments, which may be single fibers coated with a polymer, bundles of such fibers, or one or more tapes having opposing planar surfaces are wound, typically along a helical path, on a mandrel to build up the wall thickness layer-by-layer and form a hollow body. Several sources of filaments may be placed at intervals around the mandrel so that multiple filaments are applied at the same time and enable the filaments to be woven with one another to build up the wall thickness and form the hollow body. Filament winding techniques which omit the mandrel may also be used.

The welding of the one or composite plies to the structured surface of the first connection area and also to the third connection area comprises urging polymer material, e.g., thermoplastic material into indentations or open pores of the structured surface. This may be carried out by techniques such as ultrasonic welding in which mechanical force as well as ultrasonic waves are applied to the composite plies to urge the composite material into the first structured surface of the first connection area and third structured connection area or is applied to the second metallic clamp again to urge the polymer material into the indentations or open pores formed in the fourth structured surface.

A thermoplastic material softens and melts during welding and can be more easily urged into the indentations and pores form in the structured surfaces, also by the use of additional mechanical force creating a compressive force between the two metallic surfaces arranged on opposing sides of the composite ply or plies.

BRIEF DESCRIPTION OF THE DRAWINGS

Embodiments of the invention are described in more detail with reference to the accompanying schematic drawings that are listed below

DETAILED DESCRIPTION OF THE PREFERRED EMBODIMENTS

Hydrogen is of increasing interest as an energy storage medium due to its favorable gravimetric energy content. In a wide range of industrial applications, hydrogen is stored in pressure vessels also known as cryogenic tanks. In particular in transportation, where space is scarce and the relatively low specific volumetric energy content of hydrogen is an issue, the storage form is often liquid/gaseous, which improves the volumetric energy content. However, part of the energy will need to be diverted to cooling the hydrogen so as to remain in liquid form. Due to the increasing requirements to move to zero emission transportation, further improvements to liquid hydrogen storage tanks are desirable.

A metallic pressure vessel is simple in terms of manufacturing and low permeation of the pressurized hydrogen. The cryogenic tank can be placed directly behind a fuel cell/electric engine unit, for example, in a pod under the wings as part of a zero emission aircraft. Since the dimensions of such tanks need to be large and several tanks are needed, the total weight will be considerable. It is, therefore, proposed to reduce this weight by replacing the metallic pressure vessel material with polymer-based composites, such as CFRP. It is desirable that the tank should be usable over a long period of time, preferably throughout the lifetime of an aircraft with thousands of flight cycles.

Figure 1:
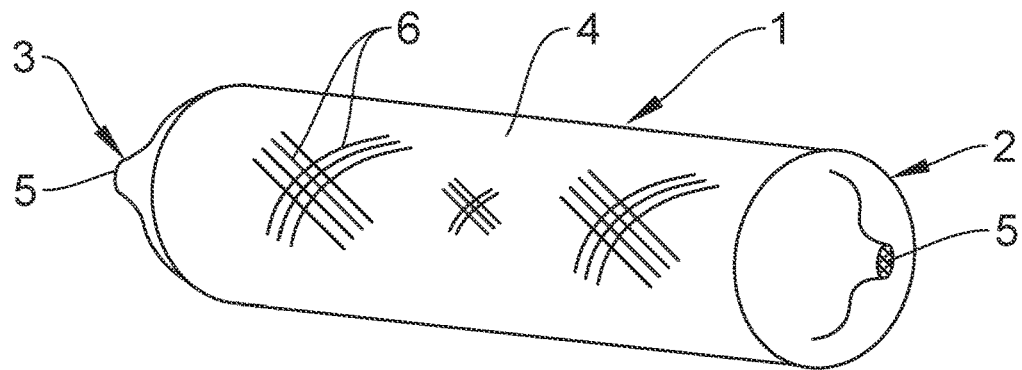
FIG. 1 illustrates a perspective view of a cryogenic storage tank.

FIG. 1 illustrates a perspective view of a cryogenic storage tank 1 fabricated according to the invention. The cryogenic storage tank 1 has a substantially cylindrical form and has a first metallic end piece 2, a second metallic end piece 3 and a substantially cylindrical hollow body 4 which extends between and is joined to the first metallic end piece 2 and the second metallic end piece 3. The first metallic end piece 2 and the second metallic end piece 3 may have a dome type shape and include one or more openings 5 which may be used for inserting cryogenic fuel, e.g., hydrogen in liquid/gas form into the cryogenic storage tank 1 and for supplying cryogenic fuel from the tank 1 to a consuming device, such as an engine of a vehicle, such as an aircraft. The hollow body 4 comprises a fiber-reinforced polymer-based composite such as a carbon fiber reinforced polymer-based composite CRFP, whereby the polymer may be a thermoplastic polymer. The fiber-reinforced polymer-based composite forms an outer wall 14 of the hollow body 4 having a thickness, whereby the wall defines an inner chamber in which the cryogenic fuel is stored.

The hollow body 4 may be formed by the application of multiple layers of composite material, which may be termed plies 6. Each layer may be formed of a filament that is coated with a polymer or may be formed of strips or layers comprising a plurality of fibers embedded within a polymer matrix. The hollow body 4 may be fabricated using filament winding techniques as is indicated by the overlapping woven arrangement of the plies 6 illustrated in FIG. 1. In filament winding, one or more filaments, which may be single fibers coated with a polymer, bundles of such fibers, or one or more tapes having opposing planar surfaces are wound, typically along a helical path, on a mandrel to build up the wall thickness layer-by-layer and form a hollow body. Several sources of filaments may be placed at intervals around the mandrel so that multiple filaments are applied at the same time and enable the filaments to be woven with one another to build up the wall thickness and form the hollow body. Filament winding techniques which omit the mandrel may be used.

FIGS. 2 to 6 illustrate methods for the joining of the composite plies 6 to the metallic end pieces 2, 3. In FIGS. 2 to 6, the attachment of the plies 6 to the first metallic end piece 2 is illustrated. However, the method is also carried out for the second metallic end piece 3 such that the wall 14 of the hollow body 4 is formed between the two opposing metallic end pieces 2, 3 and is built up to a desired wall thickness and surrounds a chamber for storing fluid such as liquid hydrogen.

Figure 2:
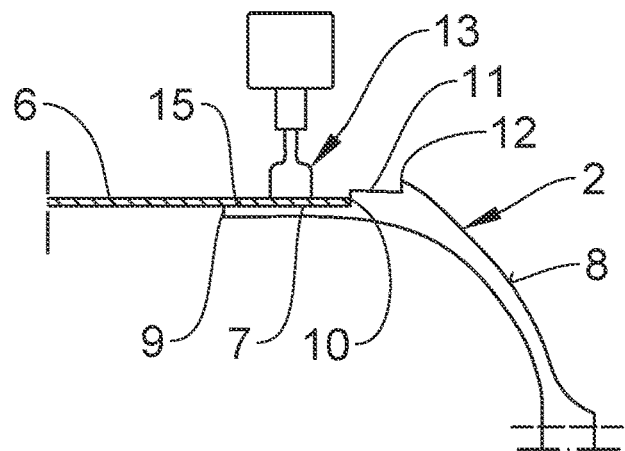
FIG. 2 illustrates ultrasonic welding of a composite ply to a metallic end piece of a cryogenic storage tank.

Referring to FIG. 2, the metallic end piece 2 has a substantial dome-shape and has a first flange 7 positioned in its outer surface 8 at its open end which extends to the end face 9 of the dome-shape. The first flange 7 has an abutment surface 10 which extends radially from the first flange 7. In this embodiment, the metallic end piece 2 includes a second flange 11 which extends from the abutment surface 10 away from the first flange 7 in an axial direction and which also has an abutment surface 12 extending outwards from the outer surface 8 of the first metallic end piece 2. The first flange 7 is used for forming the joint to the composite material of the hollow body 4. The surface 15 of the metallic flange 7 provides a connection area and has previously been textured, e.g., structured by scanning with a high energy laser, to increase the average surface roughness over the average surface roughness of the adjoining surface of the metallic end piece 2. A first ply of composite material 6 is applied to the flange 7 and is welded to the flange 7 using ultrasonic welding as indicated by the sonotrode 13 in FIG. 2. The sonotrode 13 is brought into contact with the composite ply 6, applied mechanical force and ultrasonic energy inducing vibrations into the material which causes the polymer of the composite ply 6 to melt and be welded to flange 7.

The composite ply 6 is wound, for example, typically along a helical path, to build up the wall thickness of the hollow body layer-by-layer and form the hollow body. Several sources of filaments may be placed at intervals around the intended circumference of the hollow body so that multiple filaments are applied at the same time and enable the filaments to be woven with one another to build up the wall thickness and form the hollow body. The composite ply 6 is then applied and welded to a flange of the second metallic end piece 3.

Figure 3:
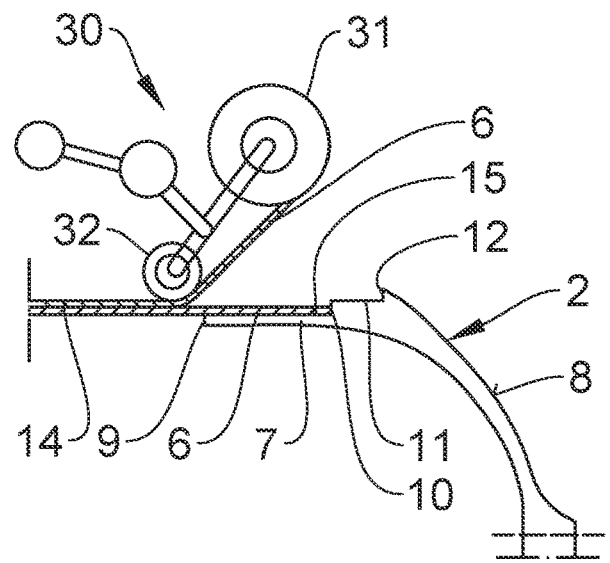
FIG. 3 illustrates applying a further composite ply to the metallic end piece of the cryogenic storage tank.

FIG. 3 illustrates a schematic view of a fiber placement machine 30 with a robotic arm which may be used to apply the composite ply 6 from a spool 31 and press it onto the underlying structure using a pressure spool 32. The pressure spool 32 can be used for consolidation of the heated composite ply 6. As is illustrated in FIG. 3, a further composite ply 6 is applied to the composite ply 6 which has already been welded onto the first flange 7 in order to build up the thickness of the wall 14 of the hollow body 4. The further composite plies 6 are also laid down by e.g., the fiber placement machine 30, and are part of the entire cylindrical region of the tank 1 that is provided by the hollow body 4.

Figure 4:
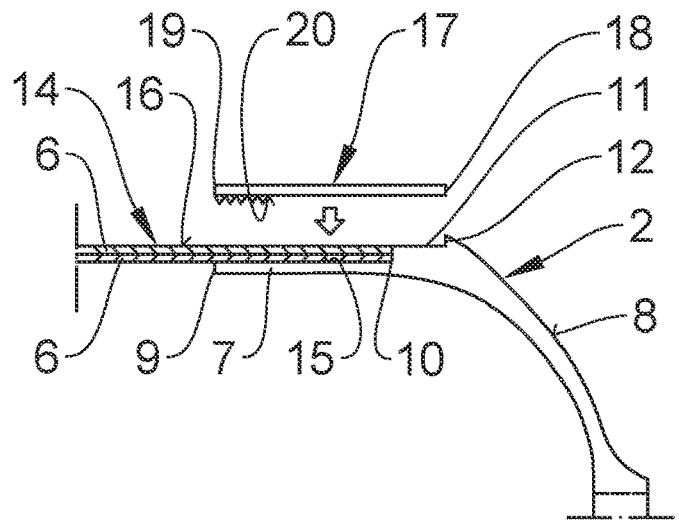
FIG. 4 illustrates applying a metallic clamp to the metallic end piece and
composite plies.

Referring to FIG. 4, after the wall thickness of the hollow body 4 has reach the desired thickness, which may correspond to the height of the abutment surface 10 such that the outermost surface 16 of the hollow body 4 is substantially coplanar with the second flange 11, a metallic clamp 17 is applied to the outer surface 16 of the stack of composite plies 6. In the embodiment illustrated in FIGS. 4 to 6, the metallic clamp 17 is formed of a separate part which may have the form of a plate or an annular ring. The metallic clamp 17 may be of the same material as the end dome and may in practice bent, since it is to be placed around the curved perimeter of the metallic end piece 2. The metallic clamp 17 has a connection surface 20 that has already been textured by high energy laser, like the surface 15 of the flange 7.

The metallic clamp 17 is placed onto the second flange 11 formed in the outer surface 8 of the metallic end piece 2 and onto the outermost surface 16 of the stack of composite plies. The metallic clamp 17 may have dimensions such that one end 18 abuts the abutment surface 12 of the flange 11 and such that the opposing end 19 is positioned substantially above the end face 9 of the first metallic end piece 2. The connection surface 20 with its structured surface is placed onto the outermost surface 16 of the stack of composite plies 6.

Figure 5:
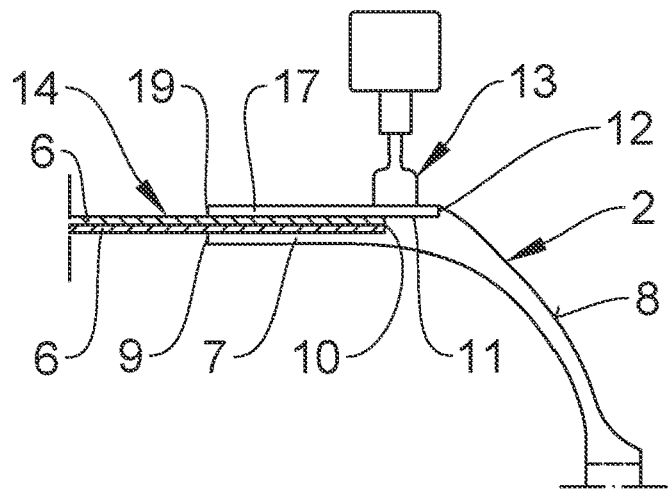
FIG. 5 illustrates welding the metallic clamp to the metallic end piece.
Figure 6:
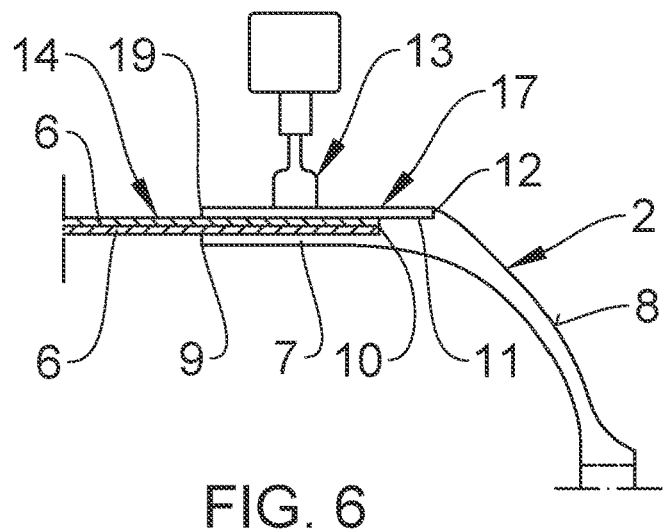
FIG. 6 illustrates welding the metallic clamp to the composite plies.

FIG. 5 illustrates that the metallic clamp 17 is first welded to the second flange 11 of the metallic end piece 2 by ultrasonic welding, as indicated by the sonotrode 13, to form a metal-metal joint between the metallic clamp 17 and metallic end piece 2. As can be seen in FIG. 6, the sonotrode 13 is then moved towards the opposing end 19 to so as to weld the metallic clamp 17 to the composite plies 6 and to form a hybrid metal polymer joint having sandwich structure in which the composite polymer-based material of the hollow body 4 is arranged between an upper metallic part provided by the metallic clamp 17 and a lower metallic part formed by the second metallic end piece 2. The fiber-reinforced composite material is also in contact with the abutment surface 10 and is, therefore, in contact with metal on three sides in the joint structure.

Figure 7:
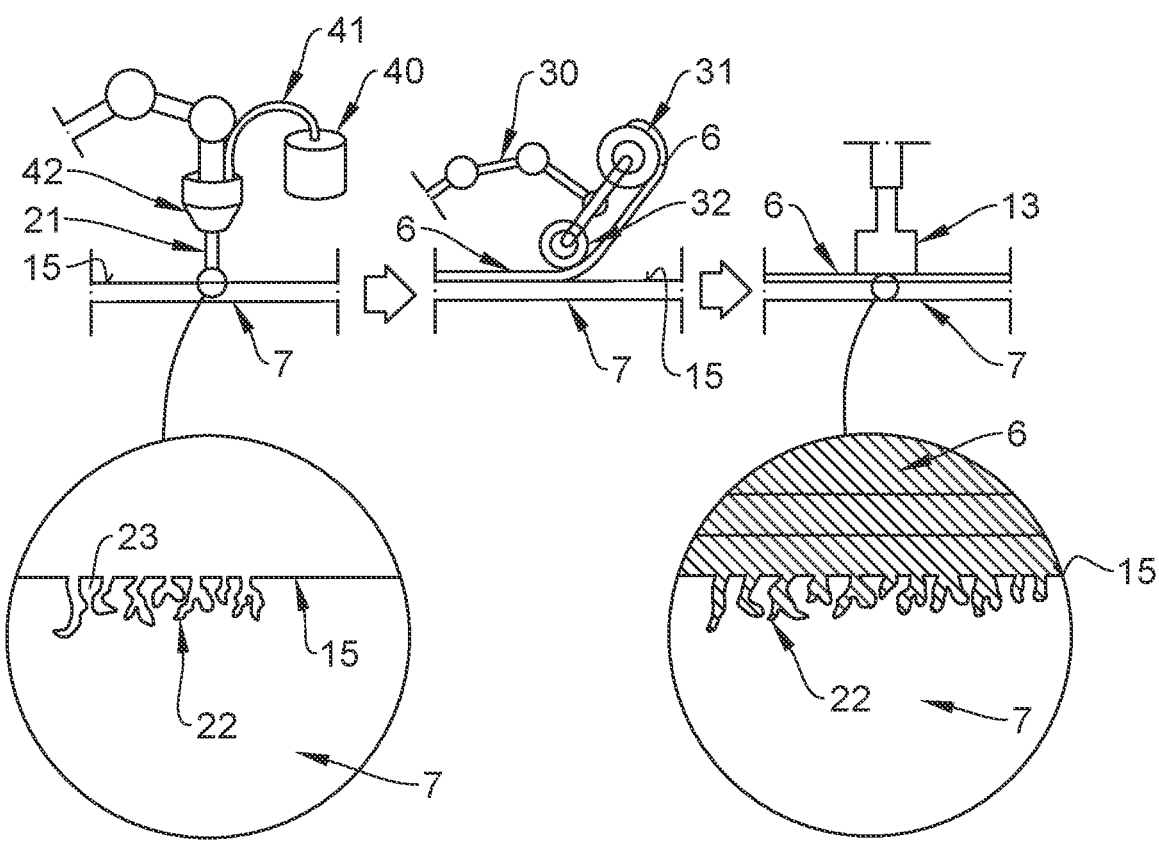
FIG. 7 illustrates enlarged views of the structured surface of the connection area of the first metallic piece, the application of the composite ply to the connection area and the ultrasonic welding of the ply to the structured surface.

FIG. 7 illustrates a process for structuring or texturing the surface of metallic parts with a high energy laser beam 21, i.e., the structured connection area 15 of the first flange 7 and the structured connection surface 20 of the metallic clamp 17, for improved mechanical stress transfer, laying of composite plies 6, which may have a tape form, by the fiber placement device 30 and subsequent welding using the sonotrode 13, such that the polymer and, in particular, the molten thermoplastic material penetrates into the pores 22 formed in the textured surface 15. The laser beam 21 is provided by a laser source 40 which is coupled by an optical cable 41 to an optical lens 42 which can be controlled so as to direct the laser beam 21 over the connection surface.

FIG. 7 illustrates an enlarged view of the surface 15 of the flange 7 and illustrates that the surface 15 is roughened so as to increase the average surface roughness compared to the starting surface and compared to the remainder of the outer surface of the metallic end pieces 2, 3 and metallic clamp 17 and create a surface profile with indentations or open pores 22 and raised areas or protrusions 23. As is also illustrated in FIG. 7, the structured surface 15 can be formed by laser structuring. After the structured surface 15 has been formed, the composite ply 6 is applied to the structured surface 15, as previously described with reference to FIGS. 2 and 3, and then the composite ply 6 is welded to the structured surface 15. This process causes the base material of the composite ply 6 to melt, in particular, the polymer matrix, typically thermoplastic material. Thermoplastic material then is urged into the open pores 22 to create an increased interfacial area between the composite ply 6 and the metallic end piece 2, in particular, the first flange 7. The connection surface 20 of the metallic clamp 17 may also be structured in this manner such that when the connection surface 20 is welded to the underlying stack of composite plies 6, the thermoplastic material is urged into the open pores 22 in the connection surface 20 of the metallic clamp 17.

Figure 8:
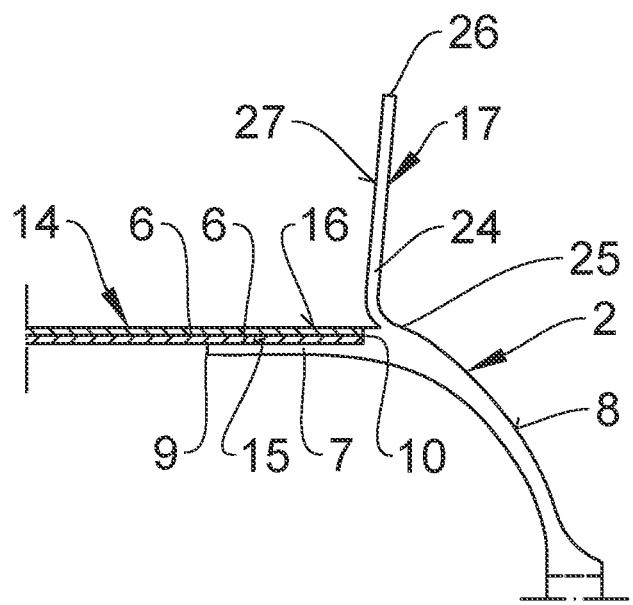
FIG. 8 illustrates an embodiment in which the metallic clamp has the form of the flap that is integral with the metallic end piece.
Figure 9:
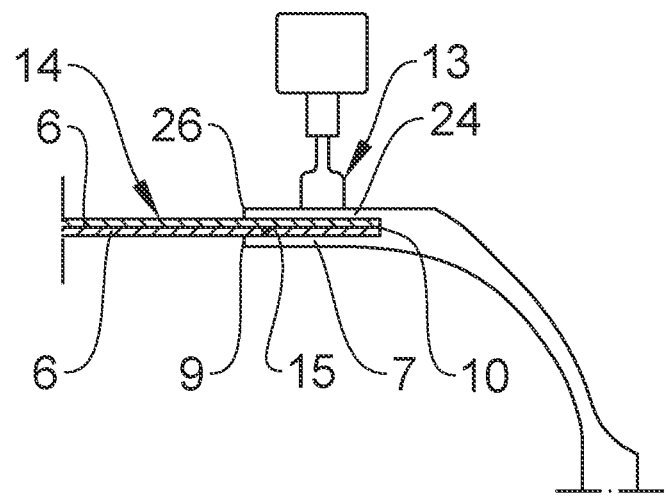
FIG. 9 illustrates the welding of the flap to composite plies.

FIGS. 8 and 9 illustrate a metallic end piece 2 of a cryogenic storage tank according to another embodiment. In this embodiment, the metallic clamp 17 is provided in the form of a flap 24 which is has one end 25 which is integral with the first metallic end portion 2 and a second end 26 which is free-lying can be bent upwards uncovering the first flange 7 so as to allow the composite plies 6 to be wound onto and welded to the first flange 7 and the thickness of the wall 14 of the hollow body 4 to be built up. The flap 24 has a connection surface 27 which faces towards the stack of composite plies 6 and which has been structured by laser texturing. After the composite plies 6 have been attached to the flange 7, the flap 24 is folded down onto the stack of composite plies 6 so that the structured connection area 27 of the flap 24 is arranged on the outer surface 16 of the stack of composite plies 6 and welded to the composite plies 6, as is illustrated in FIG. 9, for example by ultrasonic welding. The second end 26 of the flap 24 and the end face 9 of the metallic end piece 2 are aligned.

In this embodiment, the upper flange of the joint is manufactured in one part with the metallic end piece 2 and is folded away prior to installing and welding the composite plies to the lower metallic flange 7. In the last step, the flap 24 providing the upper flange is heated and folded down and then welded to the stack of composite plies 6. In this embodiment, a separate installation step for the upper metallic part of the joint can be avoided and there is one part less to handle.

Figure 10:
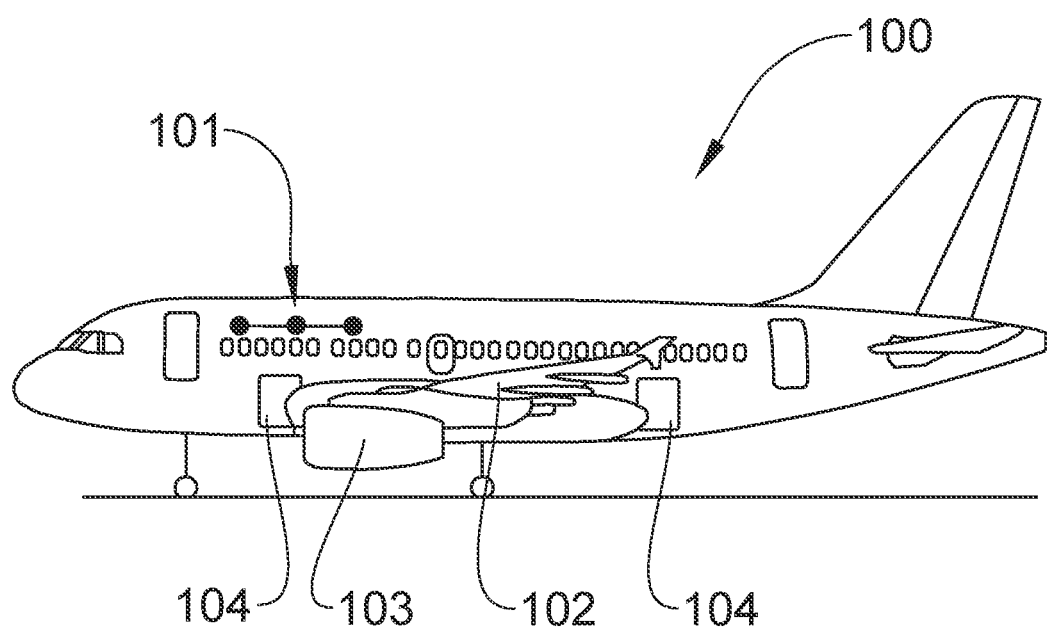
FIG. 10 illustrates a view of an aircraft including a cryogenic storage tank fabricated according to the invention.

FIG. 10 illustrates an aircraft 100 having a fuselage 101, wings 102, at least one hydrogen consuming device 103, for example, an engine and at least one cryogenic storage tank 104 according to any one of the embodiments described herein.

The cryogenic storage tank 104 and methods of fabricating a joint between the metallic end domes and the polymer-based composite of the hollow body enables composites such as CFRP laminate to be used in a cryogenic tank with low weight and robust metallic end domes with preformed pipe openings. A structurally safe and robust hybrid joint is provided between metal and CFRP without spikes and stress concentrations which is beneficial for fatigue, and enables thinner wall thicknesses than with spikes, i.e., reduced weight. The double flange concept which the polymer-based composited sandwiched between upper and lower metallic flanges 7, 11 provides a more optimal stress distribution over the thickness of the CFRP laminate, without excentricity, as would be the case with a single flange.

By limiting the use of the polymer-based composition to the hollow body area, which has a cylindrical form, manufacturing is simplified as filament winding is not required to form a decreasing radius.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS 1 cryogenic storage tank
2 first metallic end piece
3 second metallic end piece
4 hollow body
5 opening
6 composite ply
7 first flange
8 outer surface
9 end face
10 abutment surface
11 second flange
12 abutment surface
13 sonotrode
14 wall
15 structured surface for first flange
16 outer surface of hollow body 4
17 metallic clamp
18 end of metallic clamp
19 opposing end of metallic clamp
20 connection surface of metallic clamp
21 laser beam
22 open pores
23 raised areas
24 flap
25 first end of flap
26 second end of flap
27 connection surface of flap
30 fiber placement machine
31 spool
32 pressure spool
40 laser source
41 optical cable
42 optical lens
100 aircraft
101 fuse large
102 wings
103 hydrogen consuming device
104 cryogenic tank

The invention claimed is:

1. A method for forming a hybrid metal-polymer joint, the method comprising:
    forming a first structured surface on a first connection area of a first metallic object;
    forming a second structured surface on a second connection area of a second metallic object;
    applying one or more composite plies, which are fiber-reinforced and polymer based, to the first structured surface;
    welding the one or more composite plies to the first structured surface of the first connection area;
    applying the second structured surface of the second connection area of the second metallic object onto the one or more composite plies that are welded to the first structured surface of the first connection area of the first metallic object; and
    welding the second structured surface of the second connection area of the second metallic object to the one or more composite plies, and
    wherein the first metallic object is a first metallic end piece of a cryogenic storage tank and the first connection area is a first annular flange arranged in an outer surface of the first metallic end piece.

2. The method according to claim 1, wherein the first structured surface and the second structured surface are formed by laser texturing.

3. The method according to claim 1, wherein the welding comprises ultrasonic welding.

4. The method according to claim 1, wherein a plurality of composite plies is applied successively to the first structured surface and after applying each composite ply that composite ply is welded.

5. The method according to claim 1,
wherein the second metallic object comprises a clamp,
wherein the clamp comprises separate annular ring or a separate plate and the clamp is welded to the first metallic end piece and to the one or more composite plies arranged on the first annular flange, or
wherein the clamp comprises a flap that is integral with the first metallic end piece, and
wherein the second structured surface of the second connection area is applied to the one or more composite plies by folding the flap onto the one or more composite plies and the flap is welded to the one or more composite plies arranged on the first annular flange.

6. The method according to claim 5, further comprising:
providing a second metallic end piece having a second annular flange on its outer surface providing a third connection area and a second metallic clamp;
forming a third structured surface on the third connection area of the second metallic end piece;
forming a fourth structured surface on a fourth connection area of the second metallic clamp;
winding one or more composite plies to form a hollow body that extends between the first annular flange of the first metallic end piece and the second annular flange of second metallic end piece;
welding the one or more composite plies to the third structured surface of the second annular flange of the second metallic end piece;
welding the fourth structured surface of the fourth connection area of the second clamp to the one or more composite plies that have been welded to the third structured surface of the second annular flange of the second metallic end piece, and
forming a cryogenic storage tank.

7. The method according to claim 6, wherein a plurality of composite plies are successively wound onto and welded to the first annular flange and to the second annular flange so as to provide the hollow body with a desired wall thickness.

8. A cryogenic storage tank, comprising:
a first metallic end piece having a first structured connection area on its outer surface;
a second metallic end piece having a second structured connection area on its outer surface;
a hollow body extending between the first structured connection area of the first metallic end piece and the second structured area of the second metallic end piece, wherein the hollow body is formed of a fiber reinforced polymer-based composite;
a first metallic clamp on an outermost external surface of the hollow body and having a third structured connection area; and
a second metallic clamp on an outermost external surface of the hollow body and having a fourth structured connection area,
wherein the fiber-reinforced polymer-based composite of the hollow body is arranged between and in intimate contact with the first structured connection area of the first metallic end piece and with the third structured connection area of the first metallic clamp and is arranged between and in intimate contact with the second structured connection area of the second metallic end piece and with the fourth structured connection area of the second metallic clamp.

9. The cryogenic storage tank according to claim 8, wherein at least one of the first metallic clamp or the second metallic clamp comprises a plate or a ring.

10. The cryogenic storage tank according to claim 9, wherein the first metallic clamp is welded to the first metallic end piece and at least one of the hollow body or the second metallic clamp is welded to the second metallic end piece and the hollow body.

11. The cryogenic storage tank according to claim 8, wherein at least one of
the first metallic clamp has a first end that is integral with the first metallic end piece and a distal end that is welded to the hollow body, or
the second metallic clamp has a first end that is integral with the second metallic end piece and a distal end that is welded to the hollow body.

12. The cryogenic storage tank according to claim 8, wherein the first metallic end piece has a first annular flange on an outer surface and the first structured connection area is formed on the first annular flange and the second metallic end piece has a second annular flange on its an outer surface and the second structured connection area is formed on the second annular flange.

13. The cryogenic storage tank according to claim 12,
wherein the first annular flange has a first abutment surface extending radially from the annular first flange and having a height,
wherein the hollow body has a wall having a thickness that corresponds to the height of the first abutment surface and the second annular flange has a second abutment surface extending radially from the second annular first flange and having a height, and
wherein the hollow body has a wall having a thickness that corresponds to the height of the second abutment surface.

14. An aircraft, comprising:
a fuselage;
at least one wing;
at least one hydrogen-consuming device; and
at least one cryogenic storage tank according to claim 8.

* * * * *